US012524580B2

(12) United States Patent
Pedersen

(10) Patent No.: US 12,524,580 B2
(45) Date of Patent: Jan. 13, 2026

(54) PHYSICAL SECURITY PROTECTION FOR INTEGRATED CIRCUITS

(71) Applicant: Nordic Semiconductor ASA, Trondheim (NO)

(72) Inventor: Frode Pedersen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 138 days.

(21) Appl. No.: 18/562,227

(22) PCT Filed: May 20, 2022

(86) PCT No.: PCT/EP2022/063729
§ 371 (c)(1),
(2) Date: Nov. 17, 2023

(87) PCT Pub. No.: WO2022/243515
PCT Pub. Date: Nov. 24, 2022

(65) Prior Publication Data
US 2024/0386145 A1    Nov. 21, 2024

(30) Foreign Application Priority Data

May 21, 2021 (GB) ...................... 2107305

(51) Int. Cl.
*G06F 21/75* (2013.01)
*G01R 31/00* (2006.01)
(Continued)

(52) U.S. Cl.
CPC ......... *G06F 21/755* (2017.08); *G01R 31/002* (2013.01); *G06F 1/10* (2013.01); *G06F 21/554* (2013.01)

(58) Field of Classification Search
CPC ........ G06F 21/755; G06F 1/10; G06F 21/554; G01R 31/002
See application file for complete search history.

(56) References Cited

U.S. PATENT DOCUMENTS 11,971,740 B2 * 4/2024 Uytterhoeven .. H03K 19/00323
2007/0182421 A1 * 8/2007 Janke ...................... G06F 21/81
324/522

(Continued)

OTHER PUBLICATIONS

Deshpande et al., "Employing dual-complementary Flip-Flops to Detect EMFI Attacks," *IEEE Asian Hardware Oriented Security and Trust Symposium*, Oct. 2017, pp. 109-114.

(Continued)

*Primary Examiner* — Mohamed A. Wasel
(74) *Attorney, Agent, or Firm* — Klarquist Sparkman, LLP

(57) ABSTRACT

An integrated circuit comprising a detection circuit portion for detecting an electromagnetic pulse attack on the integrated circuit is provided. The detection circuit portion comprises a shadow flip-flop comprising a clock input and a clock net connected to said clock input. The detection circuit portion also comprises a clock gate connected to the clock net that is controlled by an enable signal to selectively be in an open state in which the clock gate passes a clock signal to the clock net or in a closed state in which the clock gate does not pass the clock signal to the clock net. The detection circuit portion further comprises an error circuit portion, wherein the error circuit portion is arranged to selectively output an error signal if: the shadow flip-flop is clocked by a signal from the clock net and the clock gate is in the closed state.

12 Claims, 6 Drawing Sheets

(51) Int. Cl.
    *G06F 1/10*           (2006.01)
    *G06F 21/55*         (2013.01)

(56) References Cited

U.S. PATENT DOCUMENTS

| | | | |
|---|---|---|---|
| 2014/0340134 A1* | 11/2014 | Shionoiri | H03K 3/0375 |
| | | | 327/198 |
| 2016/0162708 A1* | 6/2016 | Amanuma | H03K 19/003 |
| | | | 726/34 |
| 2018/0114038 A1* | 4/2018 | Wang | G06K 19/07363 |
| 2019/0372751 A1* | 12/2019 | Yanamadala | G06K 19/07309 |
| 2020/0326409 A1* | 10/2020 | Weisglass | G01S 15/89 |
| 2021/0081528 A1 | 3/2021 | Hershman | |
| 2021/0328761 A1* | 10/2021 | Guilley | G06F 11/1044 |

OTHER PUBLICATIONS

Gomina et al., "Power supply glitch attacks: design and evaluation of detection circuits," *IEEE International Symposium on Hardware-Oriented Security and Trust*, May 2014, pp. 136-141.
International Search Report and Written Opinion for PCT/EP2022/063729, mailed Sep. 16, 2022, 13 pages.
IPO Search Report under Section 17 for Great Britain Application No. 2107305.1, dated Feb. 15, 2022, 5 pages.
Yuce et al., "FAME: Fault-attack Aware Microprocessor Extensions for Hardware Fault Detection and Software Fault Response" *Proceedings of the Hardware and Architectural Support for Security*, Jun. 18, 2016, Chapter 4, pp. 1-8.

* cited by examiner

PHYSICAL SECURITY PROTECTION FOR INTEGRATED CIRCUITS

CROSS REFERENCE TO RELATED APPLICATIONS

This is the U.S. National Stage of International Application No. PCT/EP2022/063729, filed May 20, 2022, which was published in English under PCT Article 21 (2), which in turn claims the benefit of Great Britain Application No. 2107305.1, filed May 21, 2021.

This invention relates to integrated circuits (ICs) and more particularly to the provision of measures which may help protect against unauthorised access to certain parts of such devices.

As ICs have become more complex and powerful, an increasing amount of attention has been paid to the risks posed by unauthorised access to certain parts—e.g. those which contain sensitive data or software or which can be used to exercise unauthorised control of a device incorporating the IC. Manufacturers therefore now routinely employ measures to discourage or prevent such access by hackers.

In recent years, hackers have begun to tamper with actively running digital circuits by injecting energy into the circuit, by means of e.g. an electromagnetic pulse (EMP) or laser attack. Such attacks can provoke faulty behaviour due to changing flip-flop values, spikes on logic nets, or timing changes in the logic. Erroneous toggling of flip-flops is of particular concern, due to the possibility of spike injection in clock nets, such as by an EMP pulse, which can cause a wide set of flops to erroneously change state.

Another type of attack is a targeted attack on individual critical flops e.g. by using a backside laser. These critical flops can e.g. protect access to the debug port. A critical flop attack could therefore allow reading out assets or repurposing the circuit with assets still present in the device. As such, although a targeted attack is a higher cost attack, it is potentially more severe.

The Applicant has recognised that EMP attacks pose a security threat to integrated circuits and thus that detection measures are desirable. Typically, if critical flops are identified during design, they are individually protected by a shadow flop. The shadow flop captures the critical flop value. An XNOR gate may then take the critical flop value and the shadow flop value, and an error may be triggered if either of the flops change value due to an energy injection event such as an EMP attack.

This design however, only protects the single critical flop to which the shadow flop is connected.

A more typical attack is a directed attack with an EMP probe to a portion of the die. In this case, strong electromagnetic fields are injected onto a portion of the die surface to disturb the flip-flop contents of the die. These attacks typically only toggle components on a portion of a die. Therefore if an EMP attack occurs on a portion of the die which is not individually protected by a shadow flip-flop then no error will be triggered by the attack, allowing it to go undetected.

The present invention aims at least partly to address the issues set out above and when viewed from a first aspect provides an integrated circuit comprising a detection circuit portion for detecting an electromagnetic pulse (EMP) attack on the integrated circuit, the detection circuit portion comprising:

a shadow flip-flop comprising a clock input;
a clock net connected to said clock input;
a clock gate connected to the clock net, wherein the clock gate is controlled by an enable signal so as selectively to be in an open state in which the clock gate passes a clock signal to the clock net or in a closed state in which the clock gate does not pass the clock signal to the clock net; and
an error circuit portion;
wherein the error circuit portion is arranged to selectively output an error signal if: the shadow flip-flop is clocked by a signal from the clock net and the clock gate is in the closed state.

Thus it will be appreciated by those skilled in the art that the present invention provides a detection circuit portion for detecting EMP attacks on an integrated circuit. An EMP attack will typically cause the clock net to toggle and therefore the shadow flip-flop to receive a clock pulse from the clock net. If this occurs when there the clock gate is not opened by the enable signal, the clock signal received by the shadow flip-flop will be flagged as an error. The detection circuit portion in accordance with the present invention may only require common circuit elements and as such may be fully compatible with a normal design flow so that it can be instantiated in any normal digital logic circuit. Since the clock net will typically be toggled by an EMP attack even if the clock gate is not opened by the enable signal, the clock net may act as an energy detector. The detection circuit portion is preferably fully passive such that the closure of the clock gate means there is no active power consumption by the detection circuit portion and only minimal leakage currents are incurred.

In a set of embodiments, the integrated circuit further comprises a critical circuit portion. The shadow flip-flop may be arranged to protect the critical circuit portion. The critical circuit portion may receive the clock signal as an input and output a critical signal. The critical signal may then be input to the detection circuit portion. The error circuit portion may be arranged to compare the critical signal and the output from the shadow flip-flop and selectively output an error signal if these two inputs are the same. The critical signal and shadow flip-flop signal may be the same if the shadow flip-flop is clocked by a signal from the clock net when the clock gate is closed, as this may indicate that the pulse in the clock net comes from an EMP attack instead. In a set of embodiments the critical circuit portion comprises a critical flip-flop.

In a set of embodiments, the enable signal only enables the clock signal to pass through the clock gate to the clock net when there is a valid update made to the protected critical circuit portion, such as software writing code to a given register. In such embodiments, the shadow flip-flop is therefore only clocked when a critical value is captured by the critical circuit portion.

As mentioned above, in a set of embodiments, the error circuit portion is arranged to compare the critical signal and the output from the shadow flip-flop and selectively output the error signal if the values are the same. This may indicate that the shadow flip-flop has received one or more unexpected clock edges without a valid update being made causing the shadow flip flop to capture the same (unchanged) value as the critical circuit portion. In a set of embodiments, the detection circuit portion further comprises an XOR gate. The XOR gate may be arranged with a first input being the enable signal and a second input being the critical signal. It will be understood by those skilled in the art that the XOR gate will output a logic 0 if the first and second inputs are the same, and a logic 1 if the first and second inputs are different.

In a set of embodiments, the error circuit portion comprises an XNOR gate with a first input being the critical signal, and a second input being a signal at the output of the shadow flip-flop. It will be understood by those skilled in the art that the XNOR gate will output a logic 0 if the first and second inputs thereof are different, and a logic 1 if the first and second inputs thereof are the same. Therefore, an error signal is only output by the XNOR gate if the critical circuit portion output and shadow flip-flop output are the same.

In such embodiments the shadow flip-flop in the detection circuit portion should only be clocked to load the critical value when the enable signal opens the clock gate such that the clock signal is input to the shadow flip-flop. If a subsequent valid update is made to the critical circuit portion which is protected by the detection circuit portion (i.e. a new critical value is provided), then the enable signal will again open the clock gate. The clock gate will therefore enable the clock signal to propagate along the clock net to the shadow flip-flop. The enable signal is also an input to the XOR gate, along with the output of the critical circuit portion which is being validly written. The XOR gate will therefore output an inverted critical value as an input to the shadow flip-flop. The shadow flip-flop will therefore have a different output to the output of the critical circuit portion which it is protecting, and the XNOR gate in the error circuit portion will not output an error signal as the critical signal and shadow flip-flop values will be different.

It will be appreciated therefore that in accordance with preferred embodiments, the enable signal closes the clock gate when the critical circuit portion is not being validly written, so only if there is an energy injection in the vicinity of the clock net will the shadow flip-flop value unexpectedly toggle. This will result in the shadow flip-flop output and the critical circuit portion output having the same value, and as such the XNOR gate in the error circuit portion will output an error signal, which may provide a warning to another part of the IC that there is an EMP attack on the circuit.

In a set of embodiments, the integrated circuit ceases or pauses operation in response to the error signal output by the error circuit portion in order to prevent an attacker accessing any assets protected by the critical circuit portion.

In a set of embodiments, the clock net is distributed around the integrated circuit. The Applicant has appreciated that as the shadow flip-flop only needs to be clocked when the enable signal opens the clock gate in the event of a valid update, the clock net does not need to observe normal timing rules and can therefore be spread out in the proximity of any other custom logic along its path. Part of the clock net may be physically located in the proximity of one or more critical circuit portions; other parts may be spaced away from those critical circuit portions. In this way, the clock net is likely to be toggled by an energy injection event anywhere in the vicinity of the clock net routing, even if the attack point is far away from the end point shadow flip-flop. The circuit may therefore be able to detect the presence of a directed EMP attack even when the shadow flip-flop is not directly in the line of attack, unlike prior art designs which protect an individual critical flip-flop with an individual shadow flip-flop.

In a set of embodiments, the clock net comprises an inverter chain. If the PMOS or NMOS in any inverter in the clock net changes its static behaviour due to the energy injection, this will create a pulse which will propagate down the clock net until it reaches the shadow flip-flop.

In a set of embodiments, the integrated circuit further comprises a clock providing the clock signal. The clock may comprise an electronic oscillator arranged to output a periodic clock signal, such as a crystal oscillator. The clock signal may be used for timing purposes in the integrated circuit.

In order to protect even more critical circuit portions in various parts of the integrated circuit, in a set of embodiments the integrated circuit comprises plurality of detection circuit portions, each detection circuit portion connected to a different critical circuit portion. The clock nets from each of the plurality of detector circuit portions may be physically spread around the integrated circuit, which will offer strong protection against any energy injection events at any location in the integrated circuit.

Features of any aspect or embodiment described herein may, wherever appropriate, be applied to any other aspect or embodiment described herein.

Where reference is made to different embodiments, it should be understood that these are not necessarily distinct but may overlap.

An embodiment of the invention will now be described, by way of example only, and with reference to the accompanying drawings in which.

Figure 1:
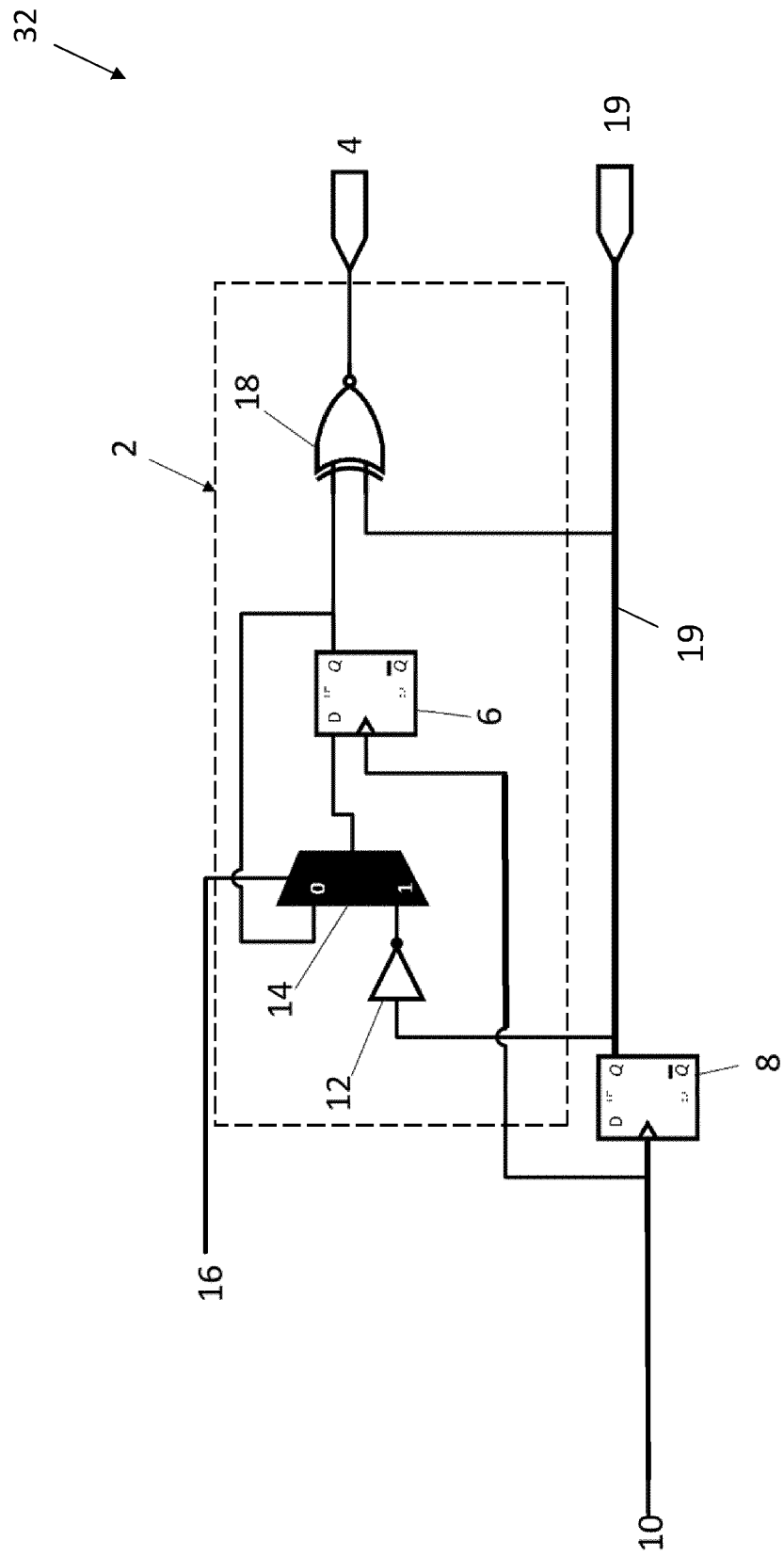
FIG. 1 shows a circuit diagram of a prior art shadow detector circuit.

FIG. 1 shows a circuit diagram of a prior art shadow detector circuit 2 in an integrated circuit 32, to protect a critical flip-flop 8 which has been identified during design. The shadow detector circuit 2 comprises a NOT gate 12, a multiplexer 14, a shadow flip-flop 6 and an XNOR gate 18.

The critical flip-flop 8 is clocked by a clock signal 10, e.g. from a crystal oscillator, which is also used to clock the shadow flip-flop 6. The critical flip-flop 8 output is also connected to the NOT gate 12 which is further connected as an input to the multiplexer 14. The multiplexer 14 has a second input from the output of the shadow flip-flop 6, as well as a selector input provided by a capture signal 16. The multiplexer 14 output provides an input to the shadow flip-flop 6. The XNOR gate 18 receives the shadow flip-flop 6 output and the critical flip-flop output 19.

The enable signal 16 provides a selector input to the multiplexer 14. The enable signal 16 is only high when a valid update to the critical flip-flop 8 occurs, such as when software is used to write to a given register.

As will be seen below, the shadow detector circuit 2 is arranged to output an error signal 4 if either the shadow flip-flop 6, or critical flip-flop 8 which the shadow flip-flop 6 is arranged to protect, change value due to an energy injection event when the enable signal 16 is low.

To achieve this, the NOT gate 12 provides an inverted version of the critical flop output to the multiplexer 14. Therefore, if the enable signal 16 is high the shadow flip-flop 6 and critical flip-flop 8 outputs will be different, and no error signal 4 will be triggered by the XNOR gate 18.

If either the shadow flip-flop 6 or critical flip-flop 8 output (Q) are changed such that the shadow flip-flop 6 and critical flip-flop 8 have the same value, an error signal 4 will be output by the XNOR gate 18. As the enable signal 16 is low when the critical flip-flop 8 is not being written to, if either the critical flip-flop 8 or shadow flip-flop 6 changes value this is interpreted as a potential attack so then the error signal 4 will be triggered.

Figure 2:
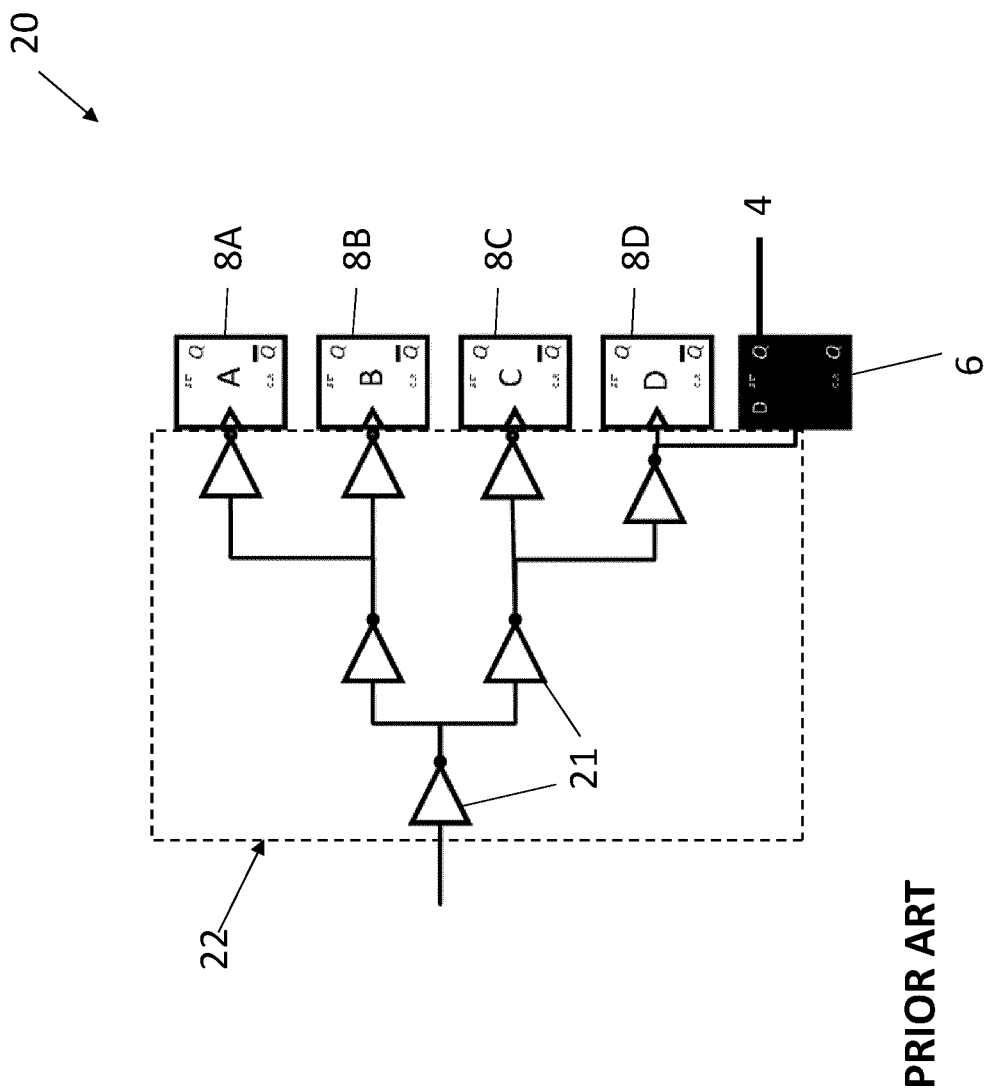
FIG. 2 shows a simplified circuit diagram of a prior art shadow flop protecting a single critical flop.

FIG. 2 shows how in such an arrangement the shadow flip-flop 6 can protect only a single critical flip-flop 8D. However, as may be seen, the exemplary synchronous circuit 20 contains four critical flip-flops 8A, 8B, 8C, 8D connected to a clock tree 22 which is comprised of inverters 21.

As the shadow flip-flop 6 is configured to protect only one of the critical flip-flops 8D, only a direct EMP attack which toggles this flip-flop 8D can be detected. However, a more likely attack is a directed attack with an EMP probe to a portion of the die on which the circuit 20 is arranged. This type of attack injects strong electromagnetic fields onto a portion of the die surface, in order to disturb flip-flop contents. Typically these attacks will only toggle a portion of the clock tree 22.

Figure 3:
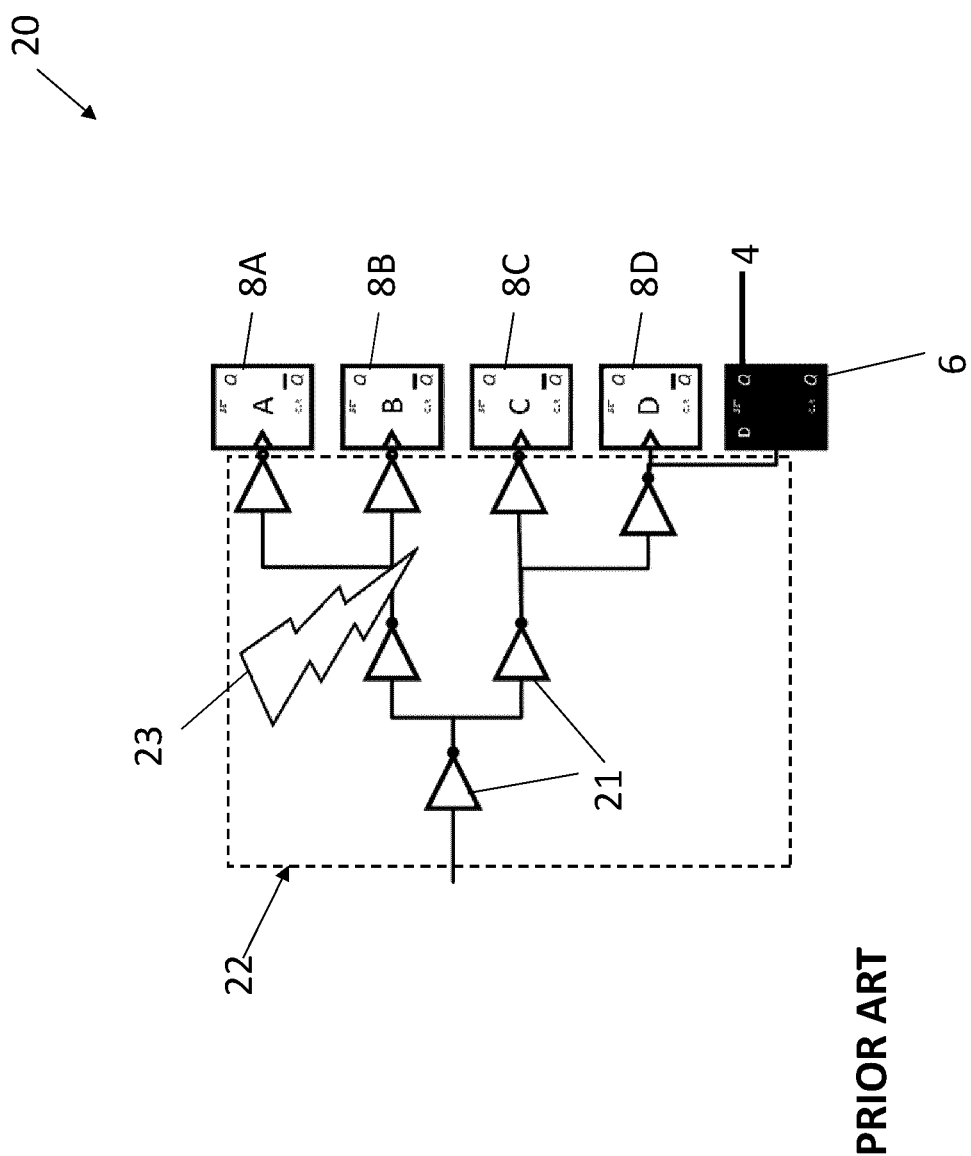
FIG. 3 shows an EMP attack on the circuit of FIG. 2.

FIG. 3 shows an EMP attack 23 on the circuit 20 of FIG. 2. Flops 8A and 8B are affected by the EMP attack, but flip-flops 8C and 8D are unaffected. As such, the shadow flip-flop 6 would offer no protection in the attack shown in FIG. 3. Whilst multiple shadow flops could be provided, this will of course add to chip area and therefore cost as well as power consumption.

Even if the EMP attack 23 did target the branch of the clock tree 22 which contains the shadow flip-flop 6, an error signal 4 would only be provided if the flip-flop 8D or the shadow flip-flop 6 actually changed value. Moreover, an attack further upstream on the clock tree 22 may toggle both the critical flip-flop 8D and the shadow flip-flop 6, in which case no error signal 4 would be output. As such, the solution shown in FIGS. 1-3 offers no protection for other flip-flops 8A, 8B, 8C, and does not even offer full protection for the 'protected' flip-flop 8D as it does not detect energy injection events unless they cause a toggle of just one of the paired flip-flops 6, 8D.

Figure 4:
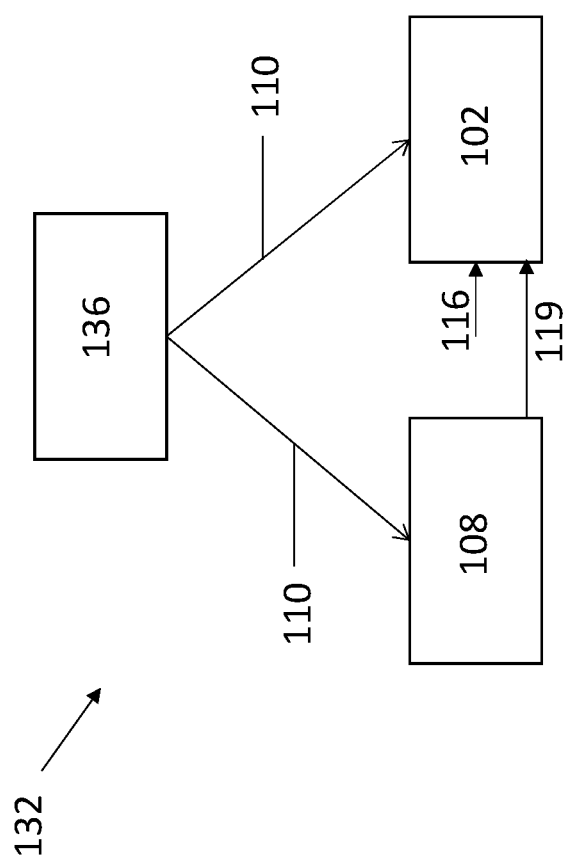
FIG. 4 is a schematic block diagram of an integrated circuit with a detection circuit portion in accordance with the present invention.

FIG. 4 is a schematic block diagram of an integrated circuit 132 in accordance with the invention. The integrated circuit 132 comprises a 'critical' flip-flop 108, e.g. one which controls access to a secure part of the integrated circuit, and a detection circuit portion 102 described in greater detail below with reference to FIG. 5. A clock 136 provides a periodic clock signal 110 to the critical flip-flop 108 and the detection circuit portion 102. The detection circuit portion 102 receives an output signal 119 from the critical flip-flop 108. The detection circuit portion 102 has a second input which receives an 'enable signal' 116 e.g. from a central processing unit (CPU) (not shown) when a valid update to the critical flip-flop 108 is being made.

Figure 5:
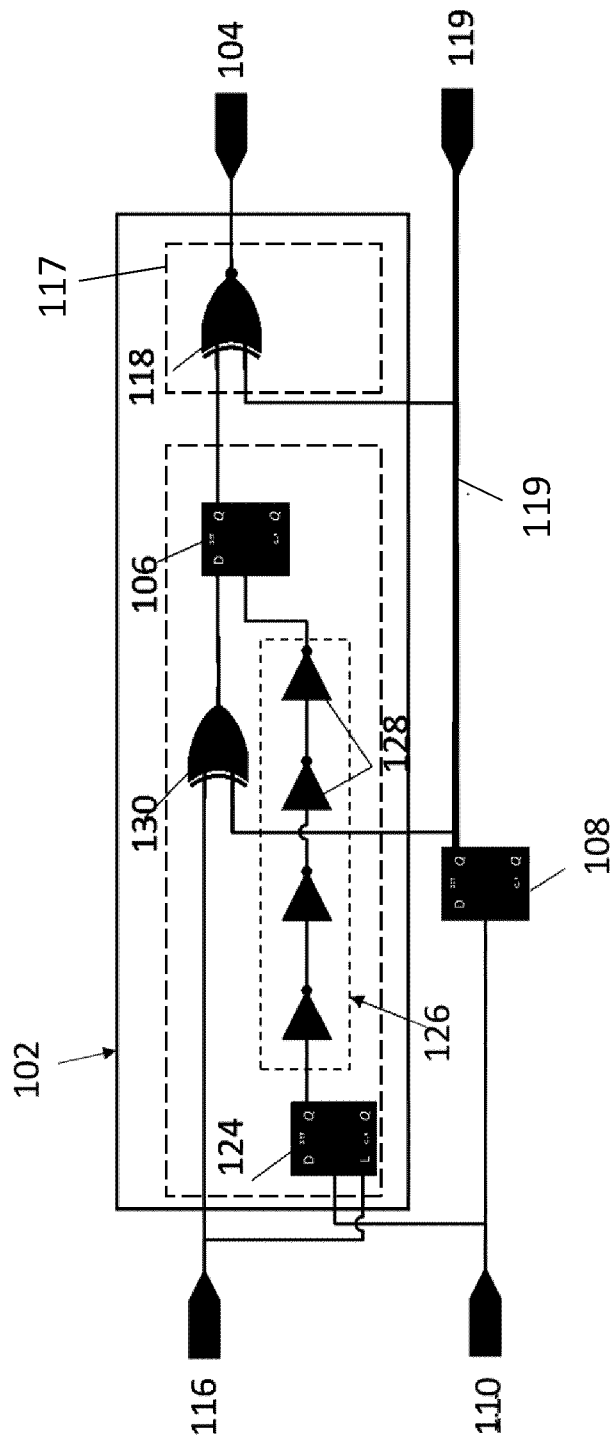
FIG. 5 shows a circuit diagram of an integrated circuit with a detection circuit portion to detect EMP attacks in accordance with the present invention.

FIG. 5 shows the detection circuit portion 102 in more detail. The detection circuit portion 102 comprises a clock gate 124 in the form of a flip-flop, a (linear) clock net 126 comprising a chain of inverters 128, a shadow flip-flop 106, an XOR gate 130 and an error circuit portion 117. The clock gate 124 is connected to the root of the clock net 126 so the output of the clock gate 124 propagates down the clock net 126 to the clock input of the shadow flip-flop 106. The error circuit portion 117 comprises an XNOR gate 118, the output of which provides the error signal 104. The clock net 126 is physically distributed around the integrated circuit 132 and located in the proximity of other custom logic along its path, as will be explained later.

The clock signal 110 is provided to the clock gate 124 as well as to the critical flop 108. The enable signal 116 is connected to an input of the clock gate 124, and the XOR gate 130.

The XOR gate 130 receives a second input which is the output signal of the critical flip-flop 108 known as the critical signal 119. The output of the XOR gate 130 provides a second input to the shadow flip-flop 106.

The output of the shadow flip-flop 106 is input to the XNOR gate 118 of the error circuit portion 117. The output signal 119 of the critical flop-flop 108 provides a second input to the XNOR gate 118 of the error circuit portion 117. The output of the XNOR gate 118 provides the error signal 104.

Operation of the detection circuit portion 102 will now be described. The clock gate 124 is controlled to be in an open or closed state by the enable signal 116 so as to selectively pass the clock signal 110 to the clock net 126 and therefore to the shadow flip-flop 106.

The enable signal 116 provided by the CPU (not shown) only switches the clock gate 124 to an open state when a valid update to the critical flip-flop 108 occurs, such as when software is used to write code to a given register. In this instance, the XOR gate 130 sends an inverted value of the critical signal 119 to the shadow flip-flop 106. As the enable signal 116 switches the clock gate 124 to an open state, the clock gate 124 passes the clock signal 110 to the clock net 126. The clock signal 110 then propagates along the clock net 126 and clocks the shadow flip-flop 106.

As the shadow flip-flop 106 receives the clock signal 110 and an inverted value of the critical signal 119 as inputs, it outputs the inverse value of the critical signal 119. The XNOR gate 118 of the error circuit portion 117 therefore has the critical signal 119 and the inverse value of the critical flop output from the shadow flip-flop 106 as inputs, i.e. its inputs are different. As such, the error signal 104 output by the XNOR gate 118 of the error circuit portion 117 is low. The enable signal 116 therefore allows the clock signal 110 to pass to the shadow flip-flop 106 when the critical flip-flop 108 is being validly written.

However the enable signal 116 does not allow the clock signal 110 to pass through the clock gate 124 to the clock net 126 when there is no valid update being made to the critical flip-flop 108. The shadow flip-flop 106 should therefore not receive any input clock signal when there is no valid update being made to the critical flip-flop 108. The error signal 104 will thus remain low.

However in case of an energy injection event, such as an EMP attack in the vicinity of the clock net 126 routing, the PMOS or NMOS in any inverter 128 in the inverter chain which comprises the clock net 126 changes its static behaviour due to the energy injection, creating a pulse which propagates down the clock net 126 to the shadow flip-flop 106. This causes the shadow flip-flop 106 to change state to match the state of the critical flip-flop 108. Therefore, the two inputs to the XNOR gate 118 of the error portion 117 are the same, thus triggering the error signal 104 to go high. In this situation the clock net therefore acts as an energy detector.

Figure 6:
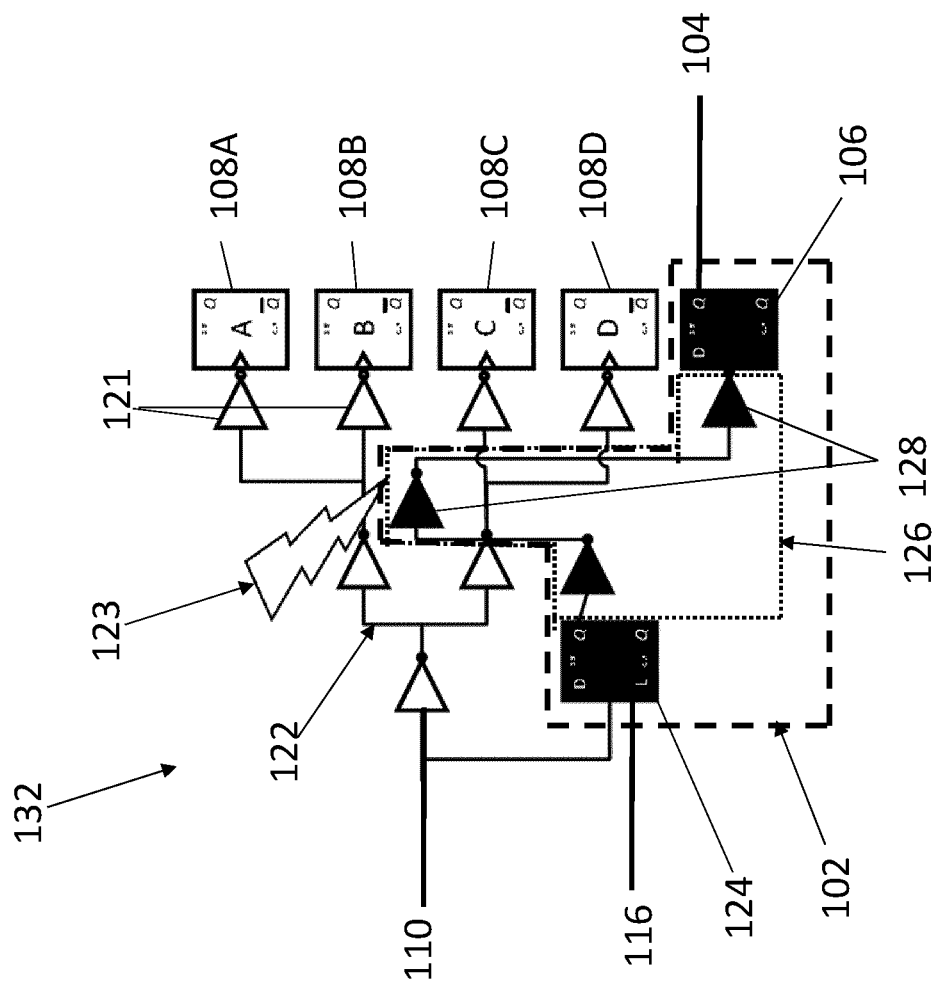
FIG. 6 shows a simplified circuit diagram illustrating use of the detection circuit portion to protect multiple critical flip-flops.

FIG. 6 shows a simplified circuit diagram illustrating how the detection circuit portion 102 as shown in FIG. 5 can protect multiple critical flip-flops 108A, 108B, 108C, 108D in the integrated circuit 132. The critical flops 108A, 108B, 108C, 108D are connected to a clock tree 122 which is comprised of inverters 121. It may be seen that the clock net 126 of the error detection circuit 102 is physically distributed around the IC 132 so that the inventers 128 thereof are adjacent to various elements such as the inverters 121 of the clock tree 122 and one of the critical flip-flops 108D. Since the clock net 126 only toggles once to load the shadow flip-flop 106, it does not need to observe normal timings rules and as such it is not adversely affected by being physically spread out around the integrated circuit 132.

The consequence of this is that it increases the chance that an EMP attack 123 occurs in the vicinity of one of the inverters 128 in the clock net 126. The detector 102 is therefore more sensitive to an attack on any part of the circuit compared to the prior art shadow detector shown in FIGS. 1-3. Any unexpected toggling of the clock net 126 when there is no enable signal will result in an error signal 104.

In order to protect more multiple critical flip-flops, multiple clock nets 126 associated with multiple detector circuits may be spread around the circuit If the error signal 104 goes high, the CPU may implement preventative measures such as rebooting, or pausing operation.

It will be appreciated by those skilled in the art that the detection circuit portion 102 described herein does not depend on any uncommon constructs; it is also fully compatible with a normal design flow, and can be instantiated in any normal digital logic circuit. Moreover as the illustrated detection circuit portion 102 is a fully passive circuit, it provides protection for critical flip-flops with very low added cost or leakage, and no active power consumption.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated circuit comprising a detection circuit portion for detecting an electromagnetic pulse attack on the integrated circuit, the detection circuit portion comprising:
   a shadow flip-flop comprising a clock input;
   a clock net connected to said clock input;
   a clock gate connected to the clock net, wherein the clock gate is controlled
   by an enable signal so as selectively to be in an open state in which the clock gate passes a clock signal to the clock net or in a closed state in which the clock gate does not pass the clock signal to the clock net; and
   an error circuit portion;
   wherein the error circuit portion is arranged to selectively output an error signal if: the shadow flip-flop is clocked by a signal from the clock net and the clock gate is in the closed state.

2. The integrated circuit of claim 1, further comprising a critical circuit portion arranged to output a critical signal, wherein the shadow flip-flop is arranged to protect the critical circuit portion.

3. The integrated circuit of claim 2, wherein the critical circuit portion comprises a critical flip-flop.

4. The integrated circuit of claim 2, wherein the enable signal only enables the clock signal to pass through the clock gate to the clock net when there is a valid update made to the protected critical circuit portion.

5. The integrated circuit of claim 4, wherein the shadow flip-flop is only clocked when a critical value is captured by the critical circuit portion.

6. The integrated circuit of claim 2, wherein the error circuit portion is arranged to compare the critical signal and the output from the shadow flip-flop and selectively output the error signal if the values are the same.

7. The integrated circuit of claim 2, wherein the error circuit portion comprises an XNOR gate with a first input being the critical signal, and a second input being a signal at the output of the shadow flip-flop.

8. The integrated circuit of claim 1, wherein the detection circuit portion further comprises an XOR gate.

9. The integrated circuit of claim 1, wherein the integrated circuit is arranged to cease or pause operation in response to the error signal output by the error circuit portion.

10. The integrated circuit of claim 1, wherein the clock net is distributed around the integrated circuit.

11. The integrated circuit of claim 1, wherein the clock net comprises an inverter chain.

12. The integrated circuit of claim 1, comprising a plurality of detection circuit portions, wherein each detection circuit portion is arranged to protect a different critical circuit portion.

* * * * *